United States Patent [19]

Davis, III et al.

[11] Patent Number: 5,977,965
[45] Date of Patent: Nov. 2, 1999

[54] AUTOMATIC FRAME ACCUMULATOR

[75] Inventors: Richard W. Davis, III, Huntsville; James Turner, Owens Crossing, both of Ala.

[73] Assignee: Intergraph Corporation, Huntsville, Ala.

[21] Appl. No.: 09/153,273

[22] Filed: Sep. 14, 1998

Related U.S. Application Data

[60] Provisional application No. 60/060,361, Sep. 29, 1997, and provisional application No. 60/072,617, Jan. 26, 1998.

[51] Int. Cl.$^6$ .............................. G06F 3/00; G06T 13/00
[52] U.S. Cl. ..................... 345/328; 345/327; 345/949; 345/960; 345/475; 386/55; 386/121
[58] Field of Search ........................... 345/302, 327–328, 345/433, 473–475, 949, 960, 972; 348/97, 107; 386/55, 121, 124

[56] References Cited

U.S. PATENT DOCUMENTS

| 3,898,438 | 8/1975 | Nater et al. ........................... 235/151 |
| 4,952,051 | 8/1990 | Lovell et al. ......................... 345/473 |
| 5,119,442 | 6/1992 | Brown ....................................... 382/41 |
| 5,491,591 | 2/1996 | Lemelson ............................... 360/35.1 |
| 5,604,857 | 2/1997 | Walmsley ............................... 345/473 |
| 5,692,117 | 11/1997 | Berend et al. ....................... 345/475 |
| 5,748,199 | 5/1998 | Palm ...................................... 345/473 |
| 5,821,946 | 10/1998 | Nakagawa ............................ 345/473 |

FOREIGN PATENT DOCUMENTS 0 428 164 A2   5/1991   European Pat. Off. .

Primary Examiner—Raymond J. Bayerl
Assistant Examiner—X. L. Bautista
Attorney, Agent, or Firm—Bromberg & Sunstein LLP

[57] ABSTRACT

A method, apparatus, and computer program product for building at least a portion of a motion picture on a computer system first monitors memory in the computer system for the creation of a frame of the motion picture. It consequently sets a flag in the computer system when it detects that the frame has been stored in the memory. Once the flag is set, the rendered frame is directed to a motion picture builder. Each frame in the portion of the motion picture being built is processed in this manner until the motion picture portion is formed.

42 Claims, 4 Drawing Sheets

AUTOMATIC FRAME ACCUMULATOR

PRIORITY

This application claims priority from provisional U.S. patent application Ser. No. 60/060,361, filed Sep. 29, 1997, entitled "AUTOMATIC FRAME ACCUMULATOR", which is incorporated herein, in its entirety, by reference. This application also claims priority from provisional U.S. patent application Ser. No. 60/072,617, filed Jan. 26, 1998, entitled "AUTOMATIC FRAME ACCUMULATOR" which is incorporated herein, in its entirety, by reference.

FIELD OF THE INVENTION

This invention relates generally to graphical rendering systems and, more particularly, this invention relates to arranging motion picture frames to produce a motion picture.

BACKGROUND OF THE INVENTION

Motion pictures typically are produced by serially positioning a large number of still pictures (i.e., "frames") on a medium, such as film, and then utilizing the medium to successively display a set number of the frames during a set time interval. Objects in the frames appear to move because each frame shows a stage of object movement that is slightly changed from that in the immediately preceding frame. Since at least twenty-four frames per second should be displayed to produce satisfactory motion picture quality, a one hour motion picture of satisfactory quality requires about 86,400 separate frames. Accordingly, production of one minute of an animated motion picture (described below) often takes a team of animators between one and three days.

Frames in a motion picture may be created by many known processes. Animation is one known frame creation process in which an animator draws the objects that are displayed in the frame. The objects may be drawn by hand, or by means of computer software on a computer system. Current animation techniques commonly utilize computer software to draw photo-realistic objects that once rendered and used in a motion picture, appear to exist and move in three dimensions (commonly referred to as "3-D animation").

FIG. 1 is a flow chart showing an exemplary process for constructing at least a portion (e.g., one minute) of an animated motion picture on a computer system. The process begins at step 100 in which models of the objects to be animated are constructed on the computer system. This typically is done with known graphical drawing software programs such as, for example, 3D Studio Max™ for Windows NT™, distributed by Autodesk, Inc. of San Francisco, Calif. Once constructed, the movements of the objects are choreographed, thus producing the geometry data necessary for rendering the moving object (step 102). The process then continues to step 104 in which environmental factors (e.g., spectral effects, coloring, texture, and fog) are added and adjusted with preview-quality rendering equipment. The display quality of preview equipment is relatively poor and thus, used for adjusting environmental factors only. Similar to step 102, step 104 produces additional data (i.e., "environmental data") that is to be used for creating, the individual frames.

The process continues to step 106 in which the environmental data and geometry data are directed to a motion picture production system that produces the motion picture. Among other things, the motion picture production system typically includes a rendering system for rending each of the frames in the motion picture, and a motion picture builder for constructing the motion picture from the rendered frames.

FIG. 2 shows an exemplary process used by the motion picture production system for producing the motion picture. The process begins at step 200 in which the frame data (i.e., the geometry data and the environmental data) is received by the rendering system. The rendering system then utilizes the frame data for rendering each of the frames represented by the received frame data (step 202). Once constructed, each rendered frame is stored in a storage device (discussed below) and identified with a number indicating where the frame is to be positioned in the motion picture (also step 202).

The mathematical computations required to render each frame can be relatively intensive, however, thus causing the rendering step to be very time consuming. For example, it typically takes between about ten minutes and one hour to render a single frame of an animated motion picture. The art has responded to this problem by dividing the processing required by the rendering step between a plurality of separate rendering units that each have an independent processor. This frame rendering technique commonly is referred to as "distributive frame rendering." Accordingly, the rendering units each are assigned a certain number of frames for processing, therefore decreasing the total time required to render each of the frames in the motion picture.

Once the frames are rendered, an animator (or other person) must manually locate each rendered frame in the storage device (step 204). Since the storage device can include numerous disk drives, directories, and additional externally connected storage devices, this step also can be quite time consuming. At step 206, each frame must be manually moved by the animator into a single directory in the storage device for access by the motion picture builder application program. Once in the single directory, the motion picture builder may arrange the frames in a preconfigured order to form the motion picture (step 208).

Although necessary, each of the above noted manual steps is very time consuming, thus delaying the production of the motion picture and increasing its ultimate production cost. Moreover, the noted prior art processes does not enable the motion picture builder to build the motion picture until each of the frames in the motion picture are rendered. A delay by a single frame therefore can delay the production of the entire motion picture.

Accordingly, it would be desirable to provide a method and apparatus that eliminates the prior noted inefficiencies in the motion picture production process.

SUMMARY OF THE INVENTION

In accordance with one aspect of the invention, a method, apparatus, and computer program product for building at least a portion of a motion picture on a computer system first monitors memory in the computer system for the creation of a frame of the motion picture. It consequently sets a flag in the computer system when it detects that the frame has been stored in the memory. Once the flag is set, the rendered frame is directed to a motion picture builder. Each frame in the portion of the motion picture being built is processed in this manner until the motion picture portion is formed.

The frame may be created by one of a plurality of rendering units that store the created frame in the memory. In accordance with another aspect of the invention, indicia is displayed on a display device indicating that the frame has been created by the computer system. Similarly, indicia also may be displayed identifying the rendering unit that created the frame.

In accordance with yet another aspect of the invention, a method, apparatus, and computer program product for building a motion picture on the above described computer system first receives an input message having data identifying the frames in the motion picture to be built. The frames then are located in the different sections of the memory. Finally, after the frames are located, the motion picture builder retrieves the located frames from the different sections of the memory to build the motion picture. The motion picture builder builds the motion picture by arranging the located frames in a preselected order. The motion picture may be a 3-D type motion picture.

In accordance with still another aspect of the invention, a method, apparatus, and computer program product for building a motion picture in the computer system repeatedly examines the memory for the production of frames in the motion picture. When it detects that a first set of frames have been produced and stored in the memory, it directs the first set of frames to the motion picture builder before a second set of frames in the motion picture are produced by the rendering units. The motion picture builder then is controlled to arrange each frame in the first set of frames in a preselected order. The first set and second set of frames each may include one frame.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF SPECIFIC EMBODIMENTS

Figure 1:
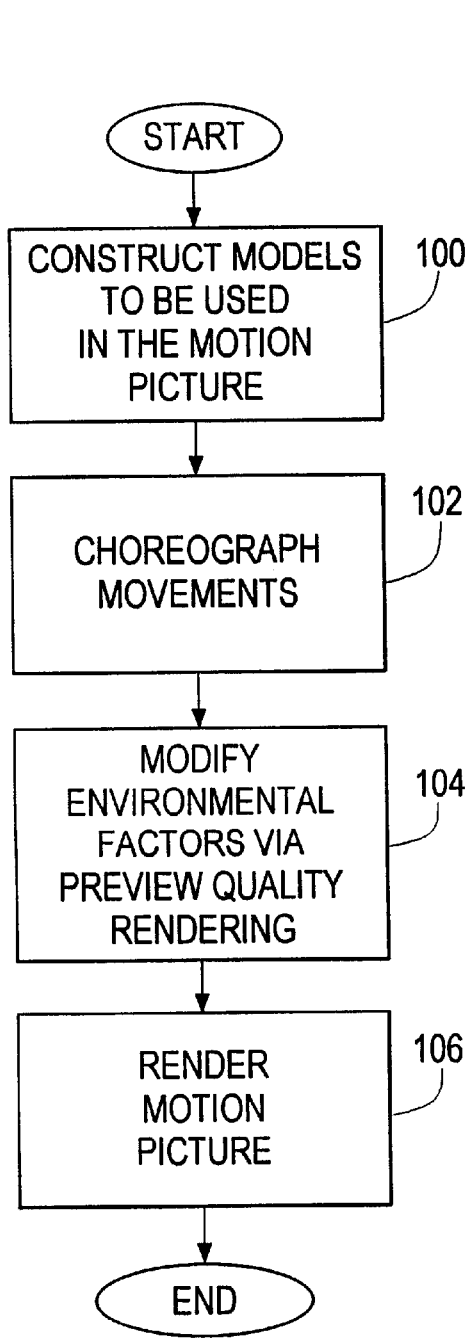
FIG. 1 is a flow chart showing a typical prior art method of building an animated motion picture with a motion picture production system.
Figure 2:
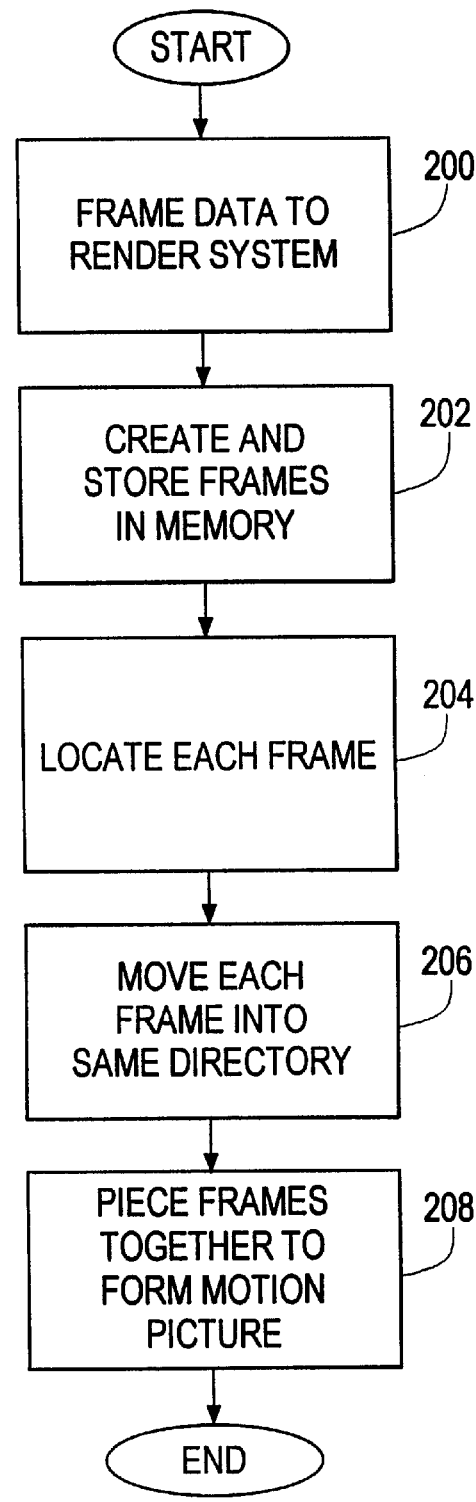
FIG. 2 is a flow chart showing an exemplary process that may be used by the motion picture production system of FIG. 1 for producing a motion picture.
Figure 3:
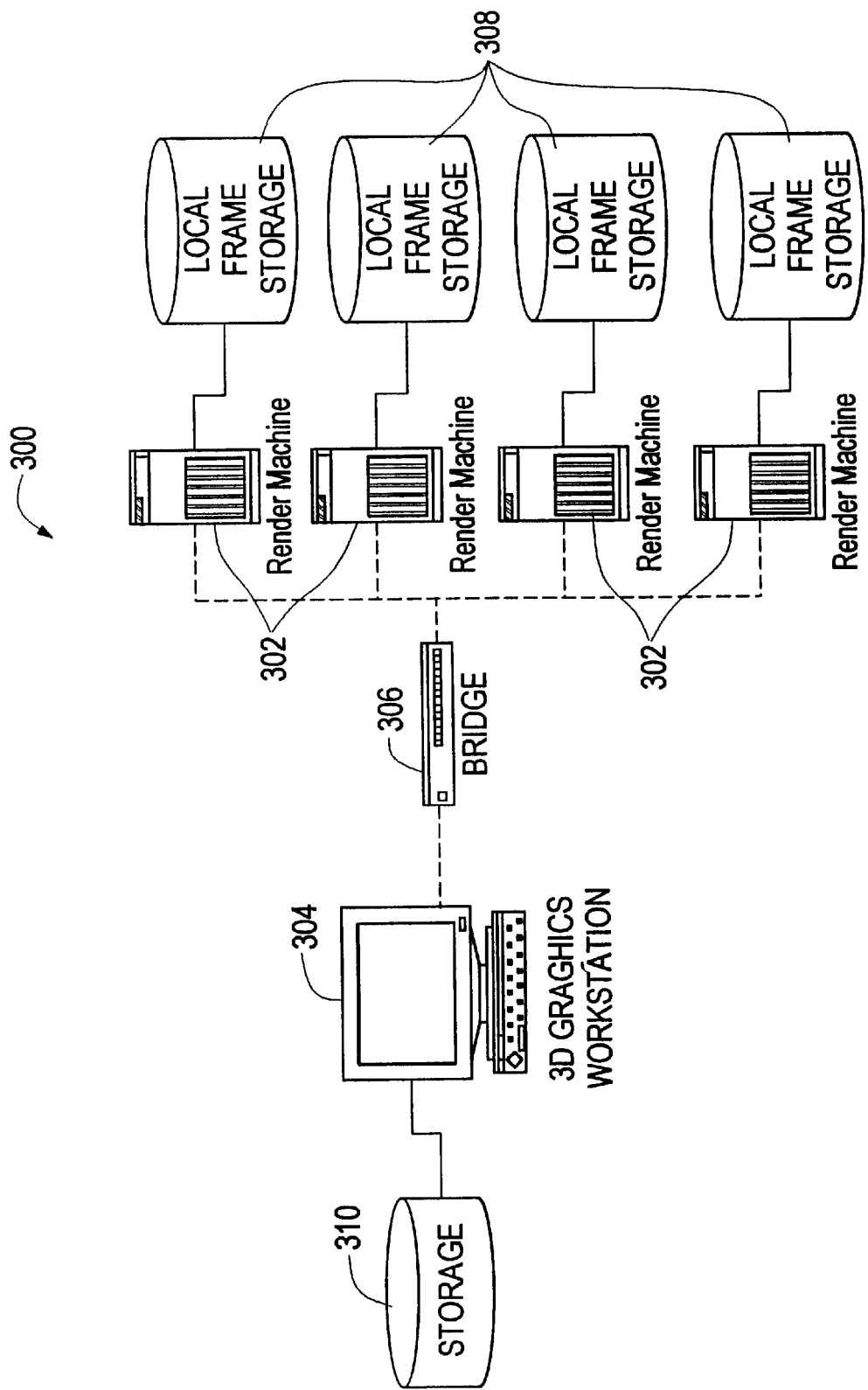
FIG. 3 schematically shows a motion picture production system that may be used with a preferred embodiment of the invention to produce an animated motion picture.

FIG. 3 shows a motion picture production system 300 that may be used with a preferred embodiment of the invention to produce an animated motion picture. It should be noted that although the invention is described with reference to an animated motion picture, its principles and teachings may be applied to other types of motion pictures such as, for example, those using conventional photography techniques, or those using a combination of animation and photography techniques. The system 300 shown in FIG. 3 utilizes a plurality of rendering units 302 (e.g., an Intergraph StudioZ RenderRAX™ rendering unit, available from Intergraph Corporation) for distributively rendering the frames in the motion picture, a graphics workstation 304 (e.g., an Intergraph StudioZ CGI/Video Authoring Workstation™, available from Intergraph Corporation) for controlling the entire motion picture production process, and a network bridge 306 (e.g., an Intergraph FINDFD15™ 10/1000 Mbps UTP ADV Switch, available from Intergraph Corporation) for connecting the workstation 304 to each of the rendering units 302. The system 300 also includes a plurality of non-volatile data storage units, including local frame storage memory 308 at each rendering unit, and workstation memory 310 at the workstation 304. Motion picture frames may be rendered in accordance with conventional processes by means of frame rendering application software executing on the workstation 304 and the rendering units 302.

The system 300 preferably is utilized on a daily basis to produce a relatively small portion of the entire motion picture. Once completed, all of the small portions of the motion picture may be assembled into the complete motion picture in accordance with conventional motion picture building processes. Each smaller portion of the motion picture, however, may be considered to be an entirely self-contained, independent motion picture.

As discussed in greater detail below, the system 300 preferably is configured to automatically and efficiently locate (within the system memory) each rendered frame to be added to the motion picture, and then arrange the frames in a preselected order to produce the motion picture. In a preferred embodiment of the invention, the frames are arranged in the preselected order while the rendering units 302 are still rendering additional frames that are required to complete the motion picture. Accordingly, the motion picture should be substantially completed as the last frame is rendered by the rendering units 302. Alternatively, the frames may be arranged in the preselected order after each frame is rendered and stored in the system memory.

Figure 4:
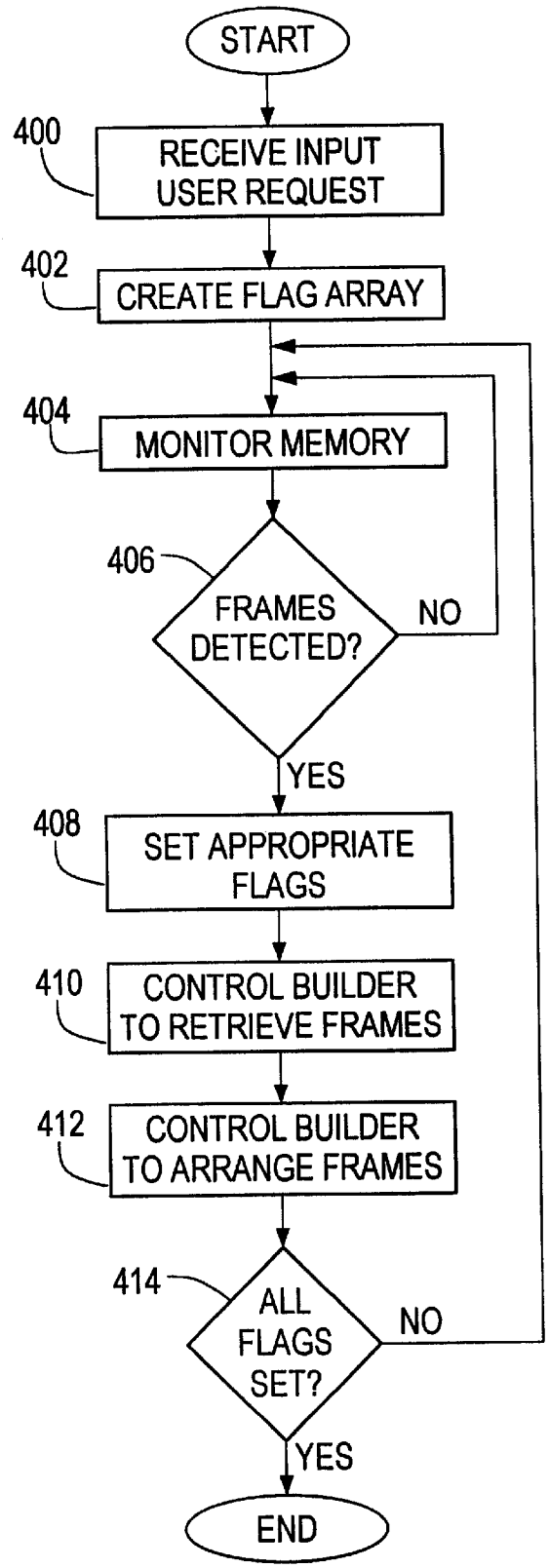
FIG. 4 is a flow chart summarizing the more significant steps of a preferred process for forming a motion picture from motion picture frames as they are created and stored in various parts of memory in the motion picture production system shown in FIG. 3.

FIG. 4 is a flow chart summarizing a preferred process for forming the motion picture from the frames as they are created and stored in the memory of the system 300. As noted above, the frames may be in different physical memory devices (i.e., either or both the local frame storage memory 308 or the workstation memory 310). In addition, the frames may be located in different directories and partitions of the various memory devices.

The process starts at step 400 in which a user enters a user input message into the system 300 requesting that the motion picture be built. As suggested above, such message may be entered before, during, or after the frames are rendered by the rendering units 302. Among the types of information that may be in the message are the name of the frames in the motion picture, the type of format used to digitally render the frames in the motion picture, the storage location of the frames within the system 300, and the number of the first frame and last frame to be assembled for the portion of the motion picture being built. When used with a Windows-based operating system (e.g., Microsoft NT®, distributed by Microsoft Corp. of Redmond, Wash.), the information may be entered via a graphical user interface having fields that may be completed in an easy manner. Similarly, when used with a DOS-based operating system, the information may be entered by command lines.

The frames may be identified in accordance with any convenient naming convention. As illustrated below, a frame may be identified by a twelve character identification string, where the first four characters are a name for a relevant group of frames, the second four characters identify the position of the frame in the motion picture, the ninth character is a period, and the last three characters are the data format of the frame in the memory. Accordingly, the frames in a motion picture may be identified as follows:

anim0001.bmp anim0002.bmp anim0003.bmp

.

.

.

anim9999.bmp

When using this identification convention, the name of the frame group is "anim", the preselected locations of the respective frames in the motion picture shown above are the first, second, third . . . and nine-thousand, nine-hundred and ninety-ninth place, and the frames are in bitmap file format as shown by the "bmp" extension.

Once the input message is received by the system 300, the process proceeds to step 402 in which an array of frame flags is created in the system 300. Each frame flag in the array is assigned one of the frames designated in the input message. As discussed below, a frame flag is set by the system 300 when it detects that the frame for that flag has been rendered and stored in the memory of the system 300 (steps 404–408, discussed below). In a preferred embodiment, each frame flag is a single bit that is considered to be not set when low (i.e., logical zero), and set when high (i.e., logical one). Any known notification means may be used, however, instead of the array of flags. For example, a message service that is compatible with the host operating system may be utilized to notify the system 300 that a frame has been rendered and stored in the memory.

As noted above, the system 300 monitors the memory locations designated in the input message at step 404. Alternatively, the system 300 may repeatedly check the memory for the frames one time for every set time interval. For example, if the frames are being rendered no faster than every ten minutes, a user may set the time interval to check the memory every ten minutes.

The process then continues to step 406 in which it is determined if frames are detected when the memory is checked. If no frames are detected, then the process loops back to step 404 to again monitor (or check) the memory for frames. Conversely, if frames are detected at step 406, the process continues to step 408, in which the identification string of each located frame is examined to determine the preselected location of each of the frames within the motion picture The frames are uniquely distinguishable from one another based upon their location within the motion picture. After the location within the motion picture of each located frame is determined from the identification string (i.e., once the located frames are identified), the system 300 then sets the frame flags in the array that are designated for the located frames.

After at least one of the flags is set and the system 300 detects that one or more flag(s) is/are set, the system 300 controls a motion picture builder application program, preferably executing on the workstation 304, to retrieve each located frame from its respective designated location in the local frame storage memory 308, and then arrange the located frames in the motion picture. Alternatively, in another embodiment of the invention, the located frames are transmitted from their respective designated local frame storage memory 308 to the builder.

The motion picture preferably is stored in the workstation memory 310 as it is being built. Once the frames are received by the builder (or retrieved by the builder, whichever the case may be), the motion picture builder may build the motion picture in accordance with conventional methods. One such method, for example, utilizes a template having an array of empty locations for positioning corresponding frames. Each location in the template may be reserved for the frame assigned to it. For example, the template may have fifty locations that are consecutively numbered from one to fifty. Accordingly, frame number one is inserted into location number one, frame number two is inserted into location number two, etc, until frame number fifty is inserted into location number fifty.

In one embodiment of the invention, a subsequent frame may not be inserted into its selected location if each of the preceding frames has not already been positioned in the template. The system 300 therefore retains subsequent frames in the workstation memory 310 until each of the preceding frames are positioned in the template. Once the preceding locations are filled, the system 300 retrieves the subsequent frames from the workstation memory 310 and positions them in the template. In another embodiment, the frames are inserted into their designated location when retrieved, regardless of the existence of the preceding frames in the template.

The process then continues to step 414, in which it is determined if all of the flags in the flag array are set. If all of the flags are not set, the process loops back to step 404 to monitor the memory for the creation of the remaining frames. If all of the flags are set, however, the motion picture should be completely built, thus ending the process.

Figure 5:
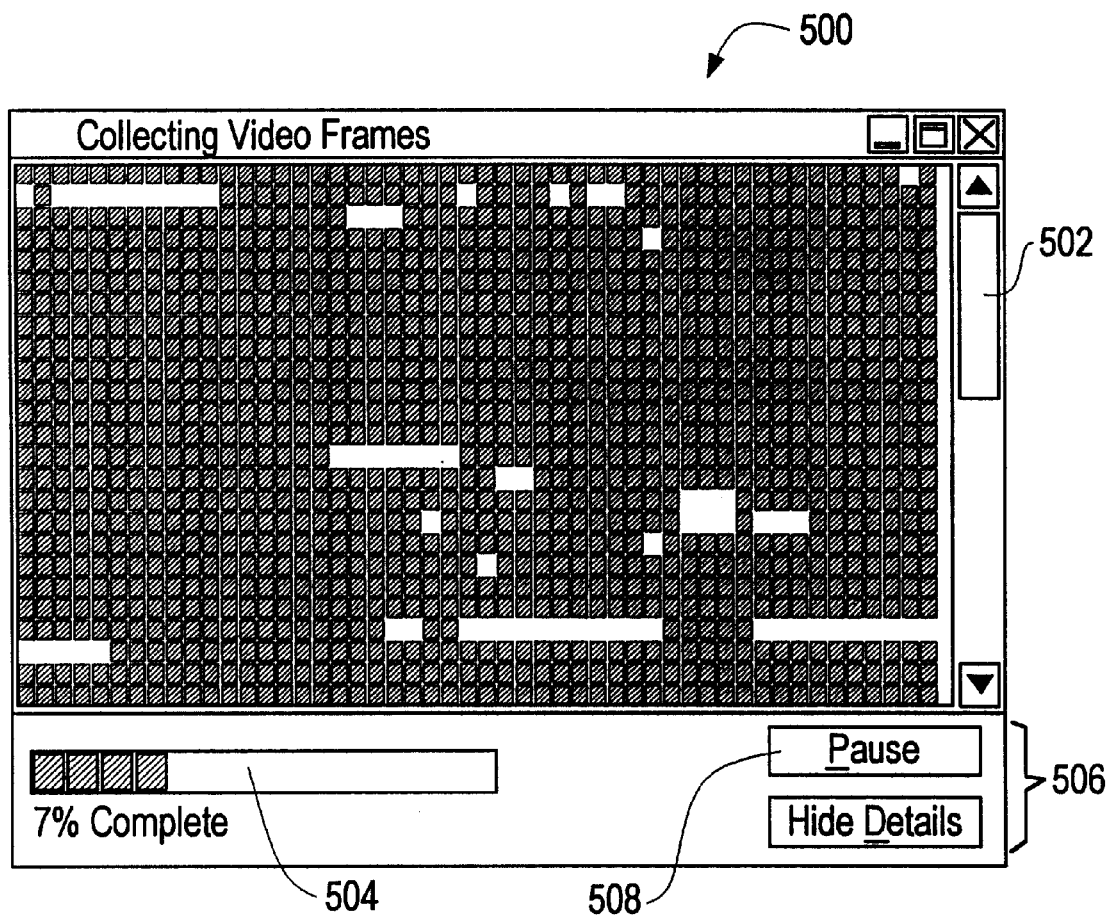
FIG. 5 is an illustration of a graphical display showing the progress of the production of a motion picture as it is being built.

The progress of the production of the motion picture may be graphically displayed on a display device as the motion picture is being built. FIG. 5 shows an exemplary graphical display 500 having indicia representing the progress of each frame. Specifically, the display 500 includes a plurality of rectangles arranged in rows across the display 500. Each rectangle represents a frame in the motion picture while the position of each rectangle represents the preselected location of each frame in the motion picture. The frames may be positioned so that each succeeding rectangle in a row (from the left side of the row toward the right side of the row) represents each succeeding frame in the motion picture. The succession of the frames continues from the last rectangle in the row (i.e., the rectangle farthest to the right in the row) to the left most rectangle in the next row down. Accordingly, the rectangle in the top left corner of the display 500 represents frame number one in the motion picture, while the rectangle in the lowest right corner of the display 500 represents the last frame in the motion picture. It should be noted, however, that such last rectangle is not visible on the display 500 as shown in FIG. 5 and may be seen by scrolling down on scroll bar 502.

The display 500 also may include a progress bar 504 to further graphically display the progress of the motion picture building process, and buttons 506 to perform various functions. For example, a pause button 508 may be included to pause the progress of the motion picture building process. As can be seen in FIG. 5, the display 500 displays both the progress of the motion picture building process, and which frames have been rendered by the rendering units 302. In addition, indicia may be included to identify the frames that were created by each or selected ones of the rendering units 302. The rendering unit identifying indicia may be unique colors assigned to each rendering unit. Accordingly, a user may be able to readily determine if one or more of the rendering units 302 are malfunctioning, or running slower than other rendering units 302, merely by observing the display 500. The identifying indicia may be any known indicia, however, such as various types of shapes or textures.

In an alternative embodiment, a preferred embodiment of the invention may be implemented as a computer program product for use with a computer system. Such implementation may include a series of computer instructions fixed either on a tangible medium, such as a computer readable media (e.g., a diskette, CD-ROM, ROM, or fixed disk) or transmittable to a computer system, via a modem or other interface device, such as a communications adapter connected to a network over a medium. Medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

The motion picture production system 300 may be used by first calling the user interface that initiates the motion picture building process. Once the information is entered in the fields of the user interface and the message is transmitted, the entire process described above proceeds to build the motion picture. Accordingly, there is no need for a person to manually locate each of the frames in the memory of the system 300, nor is it necessary for each of the frames to be moved into a single directory for processing by the motion picture builder. Moreover, the motion picture may be built much more rapidly when using the embodiment that positions the previously rendered frames as other frames are being rendered.

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

Having thus described the invention, what we desire to claim and secure by Letters Patent is:

1. A computer program product for use on a computer system for building a motion picture, the computer system having a motion picture builder and a memory, the motion picture comprising a plurality of frames, the computer program product comprising a computer usable medium having computer readable program code thereon, the computer readable program code including:

program code for monitoring the memory of the computer system for the creation of a frame in the motion picture;

program code for setting a flag in the computer system after the frame is created;

program code for detecting whether the flag is set; and program code for directing the frame to the motion picture builder when it is detected that the flag is set.

2. The computer program product as defined by claim 1 further including:

program code for utilizing the monitoring program code, setting program code, detecting program code, and directing program code for each frame in the motion picture.

3. The computer program product as defined by claim 1 wherein each frame has a designated location in the motion picture, the computer program product further including:

program code for controlling the motion picture builder to position the frame in the designated location in the motion picture for the frame.

4. The computer program product as defined by claim 1 wherein the memory has a plurality of sections, the monitoring program code comprising:

program code for examining each of the plurality of sections of the memory for the creation of the frame.

5. The computer program product as defined by claim 4 wherein the frame is in one of the plurality of sections of memory, the directing program code comprising:

program code for controlling the motion picture builder to retrieve the frame from the one of the plurality of sections of memory.

6. The computer program product as defined by claim 1 further including:

program code for displaying on a display device indicia indicating that the frame has been created.

7. The computer program product as defined by claim 6 wherein the computer system includes a rendering system for creating the frame, the rendering system comprising a plurality of rendering units, one of the rendering units creating the frame, the displaying program code comprising:

program code for displaying on the display device indicia indicating the one of the rendering units that created the frame.

8. A computer program product for use on a computer system for building a motion picture, the computer system having a motion picture builder and a memory with a plurality of sections, the motion picture comprising a plurality of frames, the computer program product comprising a computer usable medium having computer readable program code thereon, the computer readable program code including:

program code for receiving an input message comprising data identifying the frames in the motion picture;

program code for locating, in the memory of the computer system, frames having the name designated in the input message, the frames being in different sections of the memory; and program code for controlling the motion picture builder to retrieve the located frames from the different sections of memory to build the motion picture.

9. The computer program product as defined by claim 8 wherein the motion picture is produced by arranging the frames in a preselected order, the computer program product further comprising:

program code for controlling the motion picture builder to arrange each located frame in the preselected order.

10. The computer program product as defined by claim 9 further including:

program code for displaying on a display device indicia relating to the progress of the motion picture builder in arranging each located frame in the preselected order.

11. The computer program product as defined by claim 8 wherein the motion picture is 3-D.

12. The computer program product as defined by claim 8 further including:
 program code for displaying on a display device indicia relating to the progress of the motion picture builder in retrieving the located frames.

13. A computer program product for use on a computer system for building a motion picture, the computer system having a motion picture builder and a memory, the motion picture comprising a plurality of frames in a preselected order, the frames being produced by a rendering system, the computer program product comprising a computer usable medium having computer readable program code thereon, the computer readable program code including:
 program code for repeatedly examining the memory of the computer system for the production of frames in the motion picture;
 program code for detecting that a first set of frames in the motion picture has been produced by the rendering system and stored in the memory;
 program code for directing the first set of frames to the motion picture builder before a second set of frames in the motion picture are produced by the rendering system; and
 program code for controlling the motion picture builder to arrange each frame in the first set of frames in the preselected order.

14. The computer program product as defined by claim 13 wherein the first and second sets of frames each include at least one frame.

15. An apparatus for building a motion picture on a computer system having a motion picture builder and a memory, the motion picture comprising a plurality of frames, the apparatus comprising:
 means for monitoring the memory for the creation of a frame in the motion picture;
 means for setting a flag in the computer system after the frame is created;
 means for detecting whether the flag is set; and
 means for directing the frame to the motion picture builder when it is detected that the flag is set.

16. The apparatus as defined by claim 15 further including:
 means for utilizing the monitoring means, setting means, detecting means, and directing means for each frame in the motion picture.

17. The apparatus as defined by claim 15 wherein each frame has a designated location in the motion picture, the apparatus further including:
 means for controlling the motion picture builder to position the frame in the designated location in the motion picture.

18. The apparatus as defined by claim 15 wherein the memory has a plurality of sections, the monitoring means comprising:
 means for examining each of the plurality of sections of the memory for the creation of the frame.

19. The apparatus as defined by claim 18 wherein the frame is in one of the plurality of sections of memory, the directing means comprising:
 means for controlling the motion picture builder to retrieve the frame from the one of the plurality of sections of memory.

20. The apparatus as defined by claim 15 further including:
 means for displaying on a display device indicia indicating that the frame has been created.

21. The apparatus as defined by claim 20 wherein the computer system includes a rendering system for creating the frame, the rendering system comprising a plurality of rendering units, one of the rendering units creating the frame, the displaying means comprising:
 means for displaying on the display device indicia indicating the one of the rendering units that created the frame.

22. An apparatus for building a motion picture on a computer system having a motion picture builder and a memory with a plurality of sections, the motion picture comprising a plurality of frames, the apparatus comprising:
 means for receiving an input message comprising data identifying the frames in the motion picture;
 means for locating, in the memory of the computer system, frames having the name designated in the input message, the frames being in different sections of the memory; and
 means for controlling the motion picture builder to retrieve the located frames from the different sections of memory to build the motion picture.

23. The apparatus as defined by claim 22 wherein the motion picture is produced by arranging the frames in a preselected order, the apparatus further comprising:
 means for controlling the motion picture builder to arrange each located frame in the preselected order.

24. The apparatus as defined by claim 23 further including:
 means for displaying on a display device indicia relating to the progress of the motion picture builder in arranging each located frame in the preselected order.

25. The apparatus as defined by claim 22 wherein the motion picture is 3-D.

26. The apparatus as defined by claim 22 further including:
 means for displaying on a display device indicia relating to the progress of the motion picture builder in retrieving the located frames.

27. An apparatus for building a motion picture on a computer system having a motion picture builder and a memory, the motion picture comprising a plurality of frames in a preselected order, the frames being produced by a rendering system, the apparatus comprising:
 means for repeatedly examining the memory of the computer system for the production of frames in the motion picture;
 means for detecting that a first set of frames in the motion picture has been produced by the rendering system and stored in the memory;
 means for directing the first set of frames to the motion picture builder before a second set of frames in the motion picture are produced by the rendering system; and
 means for controlling the motion picture builder to arrange each frame in the first set of frames in the preselected order.

28. The apparatus as defined by claim 27 wherein the first and second sets of frames each include at least one frame.

29. A method of building a motion picture on a computer system having a motion picture builder and a memory, the motion picture comprising a plurality of frames, the method comprising the steps of:
 A. monitoring the memory for the creation of a frame in the motion picture;

B. setting a flag in the computer system after the frame is created;

C. detecting whether the flag is set; and

D. directing the frame to the motion picture builder when it is detected that the flag is set.

30. The method as defined by claim 29 further including the step of:

E. repeating steps A and D for each frame in the motion picture.

31. The method as defined by claim 29 wherein each frame has a designated location in the motion picture, the method further including the step of:

E. controlling the motion picture builder to position the frame in the designated location in the motion picture.

32. The method as defined by claim 29 wherein the memory has a plurality of sections, step A comprising the step of:

A1. examining each of the plurality of sections of the memory for the creation of the frame.

33. The method as defined by claim 32 wherein the frame is in one of the plurality of sections of memory, step D comprising the step of:

D1. controlling the motion picture builder to retrieve the frame from the one of the plurality of sections of memory.

34. The method as defined by claim 29 further including the step of:

E. displaying on a display device indicia indicating that the frame has been created.

35. The method as defined by claim 34 wherein the computer system includes a rendering system for creating the frame, the rendering system comprising a plurality of rendering units, one of the rendering units creating the frame, step E comprising the step of:

E1. displaying on the display device indicia indicating the one of the rendering units that created the frame.

36. A method of building a motion picture on a computer system having a motion picture builder and a memory with a plurality of sections, the motion picture comprising a plurality of frames, the method comprising the steps of:

A. receiving an input message comprising data identifying the frames in the motion picture;

B. locating, in the memory of the computer system, frames having the name designated in the input message, the frames being in different sections of the memory; and C. controlling the motion picture builder to retrieve the located frames from the different sections of memory to build the motion picture.

37. The method as defined by claim 36 wherein the motion picture is produced by arranging the frames in a preselected order, the method further comprising the step of:

D. controlling the motion picture builder to arrange each located frame in the preselected order.

38. The method as defined by claim 37 further including the step of:

E. displaying on a display device indicia relating to the progress of the motion picture builder in arranging each located frame in the preselected order.

39. The method as defined by claim 36 wherein the motion picture is 3-D.

40. The method as defined by claim 36 further including the step of:

F. displaying on a display device indicia relating to the progress of the motion picture builder in retrieving the located frames.

41. A method of building a motion picture on a computer system having a motion picture builder and a memory, the motion picture comprising a plurality of frames in a preselected order, the frames being produced by a rendering system, the method comprising the steps of:

A. repeatedly examining the memory of the computer system for the production of frames in the motion picture;

B. detecting that a first set of frames in the motion picture has been produced by the rendering system and stored in the memory;

C. directing the first set of frames to the motion picture builder before a second set of frames in the motion picture are produced by the rendering system; and D. controlling the motion picture builder to arrange each frame in the first set of frames in the preselected order.

42. The method as defined by claim 41 wherein the first and second sets of frames each include at least one frame.

* * * * *